(12) United States Patent
Granados

(10) Patent No.: US 8,474,852 B1
(45) Date of Patent: Jul. 2, 2013

(54) TRAILER HITCH

(76) Inventor: Matthew David Granados, Atlanta, GA (US)

( * ) Notice: Subject to any disclaimer, the term of this patent is extended or adjusted under 35 U.S.C. 154(b) by 39 days.

(21) Appl. No.: 13/195,751

(22) Filed: Aug. 1, 2011

(51) Int. Cl.
*B60D 1/36* (2006.01)

(52) U.S. Cl.
USPC ............ 280/491.2; 280/479.2; 280/478.1

(58) Field of Classification Search
USPC ....................... 280/478.1, 479.2, 491.2
See application file for complete search history.

(56) References Cited

U.S. PATENT DOCUMENTS

| | | |
|---|---|---|
| 2,438,749 A | 3/1948 | Harrer |
| 3,099,462 A | 7/1963 | Lent |
| 3,126,210 A | 3/1964 | Hill |
| 3,169,028 A | 2/1965 | Scrivner |
| 3,266,818 A | 8/1966 | Hill et al. |
| 3,860,267 A | 1/1975 | Lyons |
| 3,912,119 A | 10/1975 | Hill et al. |
| 4,176,854 A | 12/1979 | Hill et al. |
| 4,417,748 A | 11/1983 | Dortch |
| 4,807,900 A | 2/1989 | Tate |
| 4,944,525 A | 7/1990 | Landry |
| 4,991,865 A | 2/1991 | Francisco |
| 5,009,446 A | 4/1991 | Davis |
| 5,011,176 A | 4/1991 | Eppinette |
| 5,277,447 A * | 1/1994 | Blaser ............... 280/479.2 |
| 5,322,315 A * | 6/1994 | Carsten .............. 280/479.2 |
| 5,342,076 A * | 8/1994 | Swindall ............ 280/479.2 |
| 5,503,423 A | 4/1996 | Roberts et al. |
| 5,547,210 A | 8/1996 | Dugger |
| 5,560,630 A | 10/1996 | Phares et al. |
| 5,630,606 A | 5/1997 | Ryan |
| 5,941,550 A * | 8/1999 | Szczypski ........... 280/479.2 |
| 6,068,281 A | 5/2000 | Szczypski |
| 6,126,188 A | 10/2000 | Volodarsky |
| 6,328,326 B1 | 12/2001 | Slatten |
| 6,364,337 B1 | 4/2002 | Rowland et al. |
| 6,502,845 B1 * | 1/2003 | Van Vleet ........... 280/491.1 |
| 6,595,540 B1 | 7/2003 | MacKarvich |
| 6,957,826 B1 | 10/2005 | MacKarvich |
| 7,021,645 B1 | 4/2006 | Stettler |
| 7,055,845 B1 | 6/2006 | Putnam |
| 7,219,915 B2 | 5/2007 | Christensen |
| 7,255,362 B2 | 8/2007 | Smith |
| 7,293,791 B1 | 11/2007 | Williams |
| 7,568,716 B2 | 8/2009 | Dietz |
| 7,850,192 B2 | 12/2010 | Ceccarelli et al. |
| 7,857,344 B2 | 12/2010 | Hensley |
| 7,909,350 B1 * | 3/2011 | Landry ................ 280/479.2 |
| 2010/0270774 A1 | 10/2010 | Boberg et al. |

* cited by examiner

*Primary Examiner* — Kevin Hurley
*Assistant Examiner* — Michael Stabley
(74) *Attorney, Agent, or Firm* — Fish & Richardson P.C.

(57) ABSTRACT

A towing hitch includes a base having a first pivot member, a telescoping arm assembly having a second pivot member, and pivot locking mechanism. The telescoping arm assembly and the base are pivotally connected by their respective pivot members. The pivot locking mechanism is in operative engagement with the first and second pivot members and operates in one of a locking state and an unlocked state. In the unlocked state the pivot locking mechanism allows omnidirectional rotation of the first pivot member relative to the second pivot member, and when in the locking state allows only unidirectional rotation of the first pivot member relative to the second pivot member. The unidirectional rotation is in a direction that causes alignment of the first longitudinal axis of the base with the second longitudinal axis of the telescoping arm assembly.

16 Claims, 5 Drawing Sheets

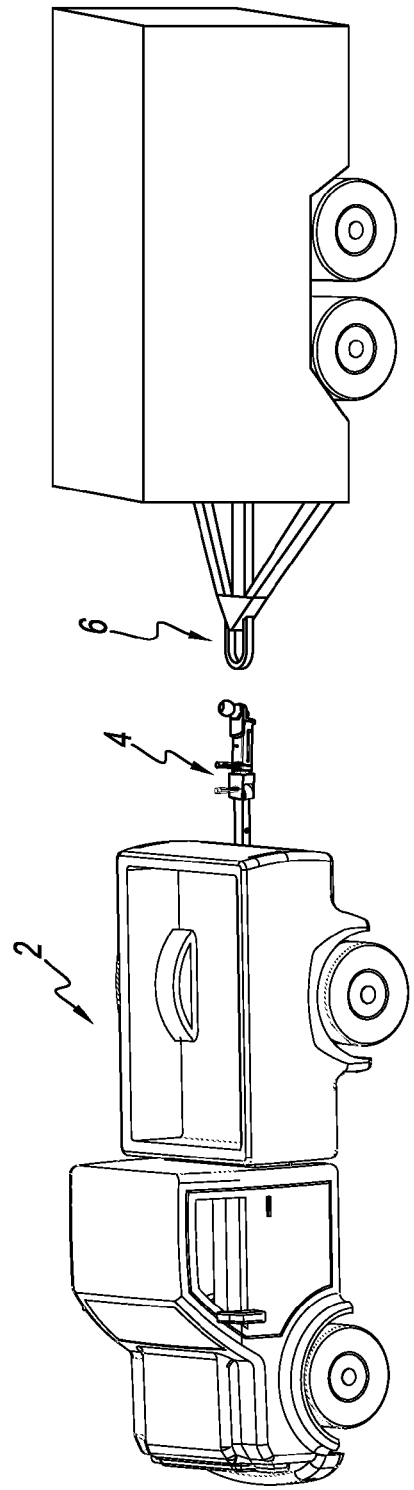
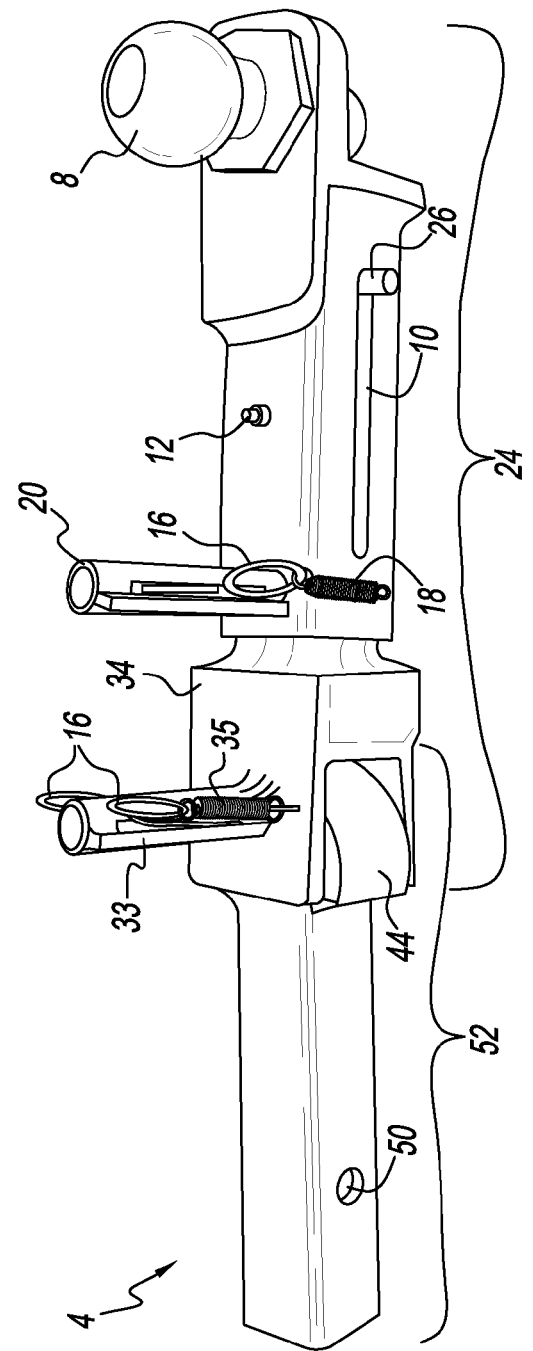
FIG. 1
FIG. 2

TRAILER HITCH

BACKGROUND

This specification relates to towing hitches.

Connecting a trailer and a towing vehicle can be a very tedious and time consuming task. Sometimes it can take up a significant amount of time, e.g., twenty minutes, before one can align a trailer and a towing vehicle so ball and coupler can connect. The task is complicated when one does not have assistance of a person standing behind the towing vehicle to monitor the alignment progress.

There are many different types of towing hitches, but each has drawbacks. The concept of attaching a trailer to a vehicle is to put a small metal ball or hook into a fitted metal coupler while operating a vehicle in reverse. To get the ball within a close region of the coupler is not terribly difficult; however, if the ball is offset as much as an inch, it can cause the operator of the vehicle to have to start the entire process over. It is desirable to have a hitch that can help with that extra few inches and make this process exponentially quicker and easier.

Prior towing hitches provided limited degrees of freedom of movement to help with the connecting process, and could easily come out of alignment if a driver accidentally went too far in one direction or another. Thus, there is a need for a towing hitch that will assist the vehicle operator to connect any item they would choose to tow with the vehicle with little or now assistance, and which is also tolerant to misalignments.

SUMMARY

In general, one innovative aspect of the subject matter described in this specification can be embodied in an apparatus including a base having first and second ends defining a first longitudinal axis and including a first pivot member at a first end; a telescoping arm assembly having first and second ends defining a second longitudinal axis and having a first member defining the first end and a second member defining the second end, the first end including a second pivot member that pivotally engages the first pivot member of the base, the first member and second member being in slidable disposition relative to each other along the longitudinal axis; and a pivot locking mechanism in operative engagement with the first and second pivot members and that operates in a locking state and an unlocked state, and when in the unlocked state allows omnidirectional rotation of the first pivot member relative to the second pivot member, and when in the locking state allows only unidirectional rotation of the first pivot member relative to the second pivot member, the unidirectional rotation being in a direction that causes alignment of the first longitudinal axis with the second longitudinal axis.

Another innovative aspect of the subject matter described in this specification can be embodied in an apparatus including a base including a first pivot member and defining a first longitudinal axis; a telescoping arm assembly including a second pivot member and defining a second longitudinal axis, the second pivot member of the telescoping arm assembly being pivotally connected to first pivot member of the base; and a pivot locking mechanism in operative engagement with the first and second pivot members and that operates in a locking state and an unlocked state, and when in the unlocked state allows omnidirectional rotation of the first pivot member relative to the second pivot member, and when in the locking state allows only unidirectional rotation of the first pivot member relative to the second pivot member, the unidirectional rotation being in a direction that causes alignment of the first longitudinal axis with the second longitudinal axis.

Another innovative aspect of the subject matter described in this specification can be embodied in an apparatus including means for pivotally connecting a base member to a telescoping arm and for facilitating omnidirectional rotation of the telescoping arm relative to the base and unidirectional rotation of the of the telescoping arm relative to the base; and means for locking the means for pivotally connecting in operative engagement with the means for pivotally connecting, the means for locking operates in a locking state and an unlocked state, and when in the unlocked state allows omnidirectional rotation of the means for pivotally connecting a base member, and when in the locking state allows only unidirectional rotation of the means for pivotally connecting a base member.

Particular embodiments of the subject matter described in this specification can be implemented so as to realize one or more of the following advantages. The apparatus is able to use the physics of the vehicle and towed item to straighten out and automatically lock into place. The apparatus is also able to contract from the expansion into a safe and drivable locked position, all without human assistance. The adjustable length of the apparatus allows for sharper turns and reduces the likelihood of jack knifing. The apparatus also allows for connection of a towing vehicle to a towing item in much less time that required for non-adjustable towing connections. The apparatus allows for both the extension function and the pivoting function to work independently of each other allowing owner to rotate omnidirectional or unidirectional in an independent manner.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 is a vehicle with an example implementation of a towing hitch, backing up to connect with a coupler of a towable item.

FIG. 2 is a perspective view of the towing hitch of FIG. 1.

Like reference numbers and designations in the various drawings indicate like elements.

DETAILED DESCRIPTION

Figure 3:
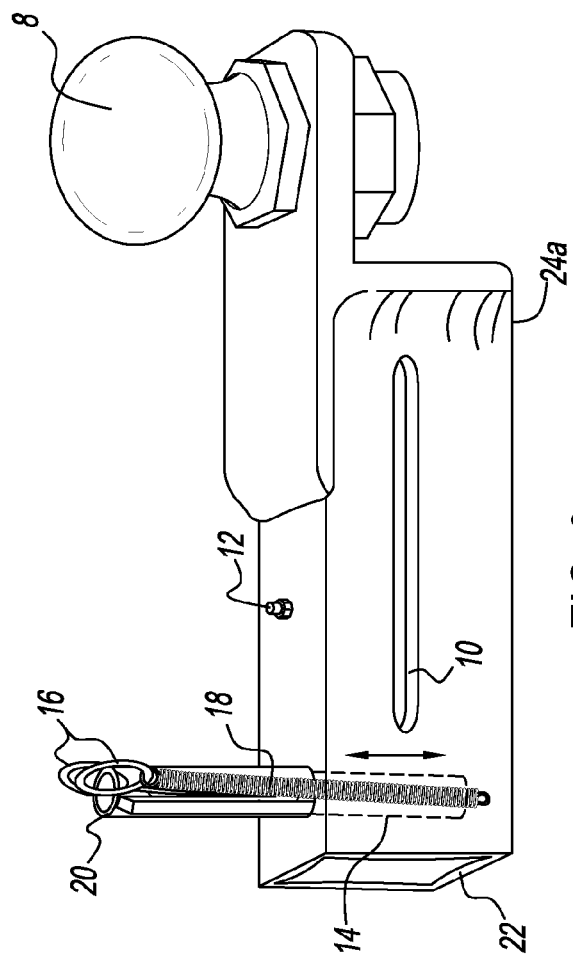
FIG. 3 is a perspective view of the outer member of the telescoping arm of the towing hitch.

In the illustrated embodiment, the apparatus has a pivoting joint, called the pivot, which will allow the hitch to rotate freely in left and right motion over a 180 degree radius while a locking mechanism is in an unlocked state (e.g., as pivot pin that is raised). In one example, the pivot joint includes a pivot member and a C socket that receives the pivot member. As the hitch begins centering to the vehicle, there are specifically designed ridges and steps, generally referred to as a pivot ladder, that are located in a pivot track of the pivot member and that preclude the rotational movement of the towed item towards the vehicle when the locking mechanism is in a locking state (e.g., when a pivot pin is released and under compressive force so that it engages the pivot ladder). This forces the towed object towards the center and locked position.

In some implementations, there are five levels of the pivot ladder for the pin to rest on. The pivot ladder, in some implementations, includes adjacent stepped surfaces that of decreasing height relative to a central aperture that receives the pivot pin. With the pivot pin fully extended and in the unlocked state, the pivot pin does not engage the pivot ladder and the hitch is able to rotate in an omnidirectional manner. The pivot track guides the pivot pint into its secured and locked position within the aperture when the locking mechanism is in the locking state. The locking mechanism, when in engagement with the pivot ladder during the locking state, allows only unidirectional rotation so that the pivot pin only progresses towards the aperture.

In some embodiments, a telescoping arm that allows the forward and backwards motion of the ball is included in the hitch. The telescoping arm includes at least two members that slide smoothly against each other due to an internal bevel on each member.

The beveled edges cause less friction and smoothly allow the telescoping arm to collapse into its safe positioning. There is a steel rod, a restrainer, which will run on a track to insure that the hitch does not over extend.

In some embodiments, the ball is above the hitch. This configuration takes advantage of the forward and vertical motion of the towed item and the coupler to help ease the sliding process for the hitch to contract into its safe and locked position.

In some implementations, the apparatus has two locking mechanisms. There is one locking mechanism, the extension pin that automatically locks the telescoping arm and stops it from expanding or collapsing. The second locking mechanism, e.g., a pivot pin, allows for the omnidirectional rotation in an unlocked state, automatically disables the omnidirectional rotation when in a locking state and allows only for unidirectional rotation in the locking state, and precludes all rotational movement when in the locked state. Both pins have a pin casing over them to protect the pin as well as help guide the pin into the correct position. By using springs and gravity, the pins ride over the apertures and immediately drop into a locked position without any outside assistance.

FIG. 1 is a vehicle 2 with an example implementation of a towing hitch 4, backing up to connect with a coupler 6 of a towable item.

FIG. 2 is a perspective view of the hitch 4 showing it in its locked position. As shown, a ball 8 is in line with the rest of the hitch 4, the telescoping arm 24 is pushed is in a contracted and locked position with the extension pin 14 down, the spring 18 imparting compressive force to keep the pin in the locked position. In order to have the hitch 4 in its unlocked state, a user pulls the finger grips 16, which extends the spring 18 and removes the pin 14 from an aperture located in first member 24a of two members 24a and 24b of the telescoping arm 24. The members 24a and 24b are then in slidable disposition relative to each other along the longitudinal axis of the telescoping arm 24.

Atop of the telescoping arm 24 is a grease fitting 12 that can be used for applying lubrication. On the side of the telescoping arm 24 is an extension track 10 and an extension restrainer 26. On the telescoping arm 24 the extension pin 14 is protected by the pin casing 20.

A pivot locking mechanism includes a pivot pin 36, springs 35, and a pin casing 33, and is connected to a "C" socket 34 that is used to receive a pivot 44. Together the C socket 34 and the pivot 44 form first and second pivot members that form a pivot connection connected at a pivot point. The pivot 44 is connected to a base 52. The base 52 can be inserted into the back of the vehicle and safely locked into place by putting a locking pin through the vehicle pin lock aperture 50.

The pivot pin 36 is in an unlocked position with the pin 36 is refracted (e.g., when a user pulls on the finger grips 16 and pulls the pin upward), which causes the pivot locking mechanism to be in an unlocked state. When in this state, omnidirectional rotation of the first pivot member relative to the second pivot member is allowed. When the pivot pin is released and when the longitudinal axes of the base 52 and telescoping member 24 are not aligned, the locking mechanism is in a locking state (explained in more detail below), and only unidirectional rotation of the first pivot member relative to the second pivot member is possible. The unidirectional rotation is in a direction that causes alignment of the first longitudinal axis of the base 52 with the second longitudinal axis of the telescoping arm 24.

Finally, when the longitudinal axes align, then the locking mechanism enters the locked state. In this state, the pivot locking mechanism precludes rotation of the first pivot member relative to the second pivot member when in the locked state. For example, in some implementations, the pivot 44 has an aperture that is centered on the longitudinal axis of the base 52, and the pin 36 engages the aperture (i.e., goes though the aperture) to preclude further rotation in any direction.

FIG. 3 shows a first member 24a of the telescoping arm, which is the outer longitudinal piece that slides over top of the second member 24b (illustrated in FIG. 4), which is the inner longitudinal piece. This allows the hitch 4 to extend and contract. The ball 8 is a standard ball.

The extension track 10 slides along the extension restrainer 26. The extension restrainer 26 ensures there is no over extension. The extension pin 14 is used to lock and unlock the telescoping arm 24 and allow it to extend by using the finger grips 16 to extend the spring 18. Once extension pin 14 is raised the telescoping arm 24 can easily extend and contract. To protect the extension pin 14 there is a pin casing 20, which allows for support and guidance of the extension pin 14.

Figure 4:
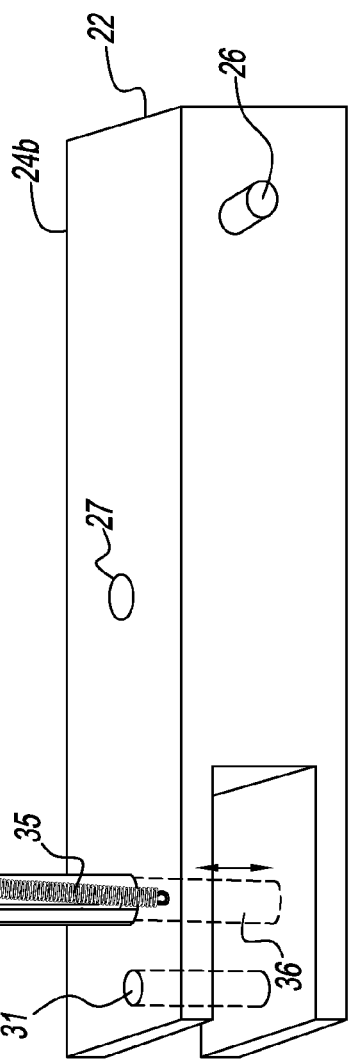
FIG. 4 is a perspective view of the inner member of the telescoping arm of the towing hitch.

When the telescoping arm 24 contracts to its closed and safe towing position, the spring 18 forces the extension pin 14 into the extension lock 27 of the member 24b (FIG. 4). The telescoping arm will remained in its locked state until the extension pin 14 is raised again. To reduce friction of the slidable engagement, the members 24a and 24b have beveled edges 22.

Figure 5:
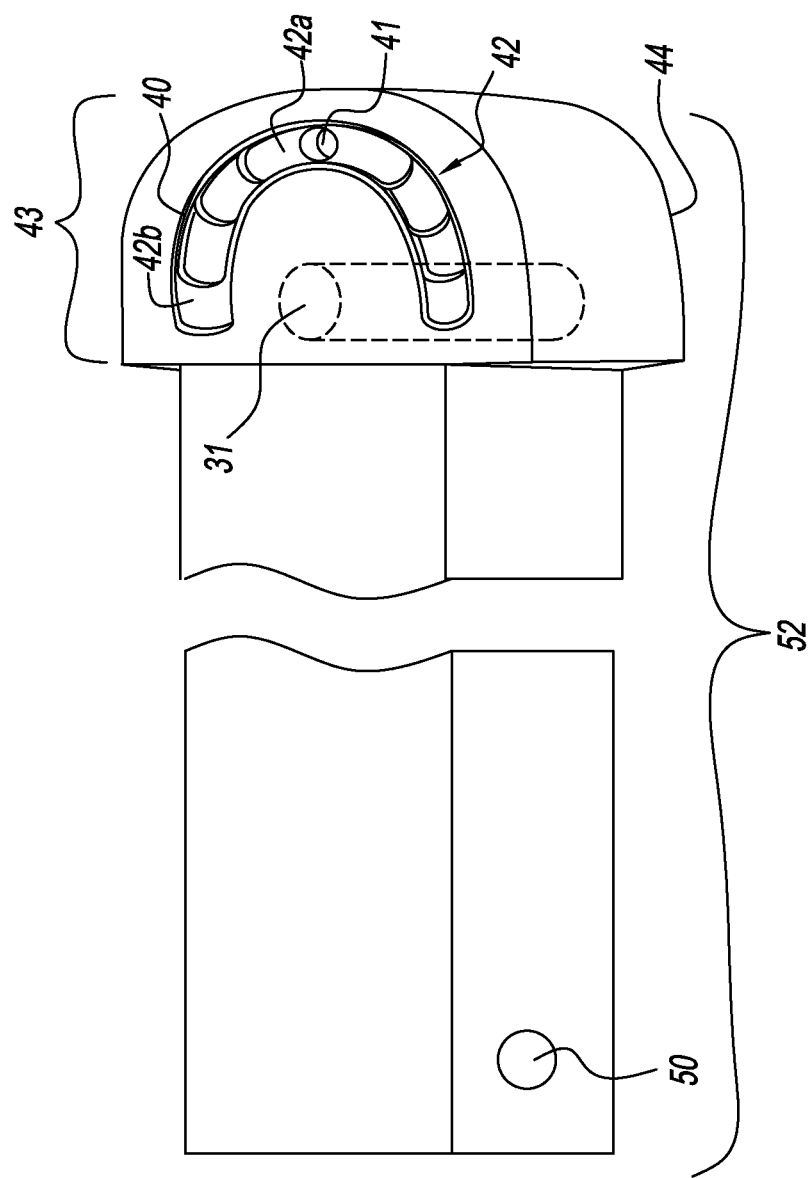
FIG. 5 is a perspective view of the base of the towing hitch.

The C socket 34 engages the pivot 44 of FIG. 5 by attaching to the base 52 at a pivot point 31. FIG. 5 shows the pivot 44 at one end of the base 52. The pivot 44 has, in some implementations, a curved geometry 43, which allows the "C" Socket 34 of FIG. 4 to move easily around it. A pivot track 40 is a track that guides the pivot pin 36 to towards an aperture 41, which is generally referred to as a pivot lock aperture. The pivot lock aperture 41 is centrally disposed on the longitudinal axis of the base 52.

To insure that the hitch 4 only rotates to the pivot lock aperture 41 when in the locking state, a pivot ladder 42 is located inside the pivot track 40. The pivot ladder 42 is a series stepped surface that are selectively engaged by the pivot locking mechanism, e.g., by the pin 36. The height of each stepped surface relative to the aperture incrementally increases in proportion to a distance from the aperture. Thus, the stepped surface 42a adjacent to the aperture has a lower relative height than the stepped surface 42b farthest from the aperture 41.

During the locking state, the engagement of an adjacent stepped surface from a currently engaged stepped surface can only occur when the height of the adjacent stepped surface relative to the aperture 41 is lower than the height of the currently engaged stepped surface relative to the aperture 41. This is because the pin 36, once it falls onto a stepped surface and engages the surface, cannot be raised without user intervention to re-engage a higher stepped surface. Instead, the pin 36 will hit the end of the higher stepped surface, and preclude further relative rotation of the pivot members. Accordingly, when in the locked state, the locking mechanism only allows unidirectional progress towards the aperture 41. During the unidirectional rotation, the pivot members may be able to rotate slightly so that the pin can move away from the aperture, but such rotation is limited by the length of the engages stepped surface in the pivot ladder 42. Accordingly, as used herein, unidirectional rotation can include rotation motion away from the aperture, but only to the extent allowed by the length of the stepped surface, or by the length/angle of any appropriate structure that allows for the discretized preclusion of rotation as described above.

Thus, in the example embodiment shown, once the pivot pin 36 rotates over a lower stepped surface relative to the surface it is currently engaged, it drops to engage the lower stepped surface. The pivot pin 36 is therefore unable to freely rotate in an opposite relationship to the aperture 41. Finally, once the longitudinal axes of the base 52 and the telescoping arm 24 are aligned, the pivot pin 36 will fall into the aperture 41 and lock the pivot members to preclude rotation in any direction.

In some embodiments, the pivot point that is used to connect the C socket 34 to the pivot 44 is located at a point on the first pivot member so that pivot track 40 is interposed between the pivot point 31 and a distal edge of the base 52. However, the pivot point 31 could be positioned so that pivot point is interposed between the pivot track and the distal edge of the base 52. In this latter configuration, the pivot track 40 would be reversed in its disposition so that aperture 41 is located farther from the distal end than the highest stepped surfaces.

Figure 6:
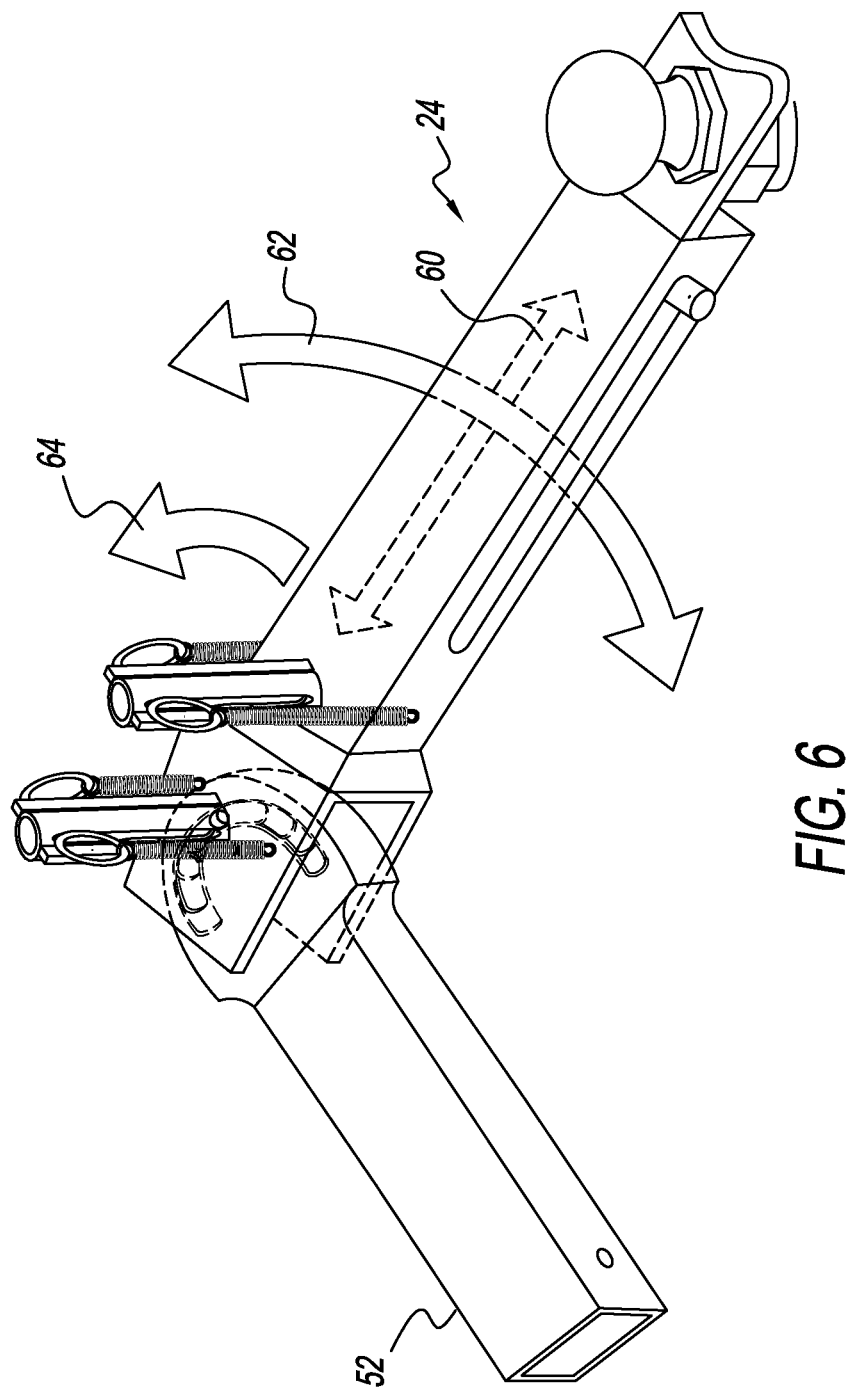
FIG. 6 is a perspective view of the towing hitch showing its full mobility.

FIG. 6 illustrates the mobility of the hitch 4. The base 52 goes into the vehicle and is secure. At that point by pulling up on the finger grips 16 the extension pin 14, a user can you can manually pull out the a member of the telescoping arm 24 to extend far out as needed to place the ball 8 into a coupler 6 of a towed device, as indicated by the double-sided arrow 60 along the longitudinal axis of the telescoping arm 24. Furthermore, the hitch 4 has the ability to rotate in an omnidirectional manner by placing the locking mechanism in an unlocked state to allow free rotation of the pivot 44 relative to the C socket 34, as indicted by the omnidirectional arrow 62. With the pivot pin 36 pulled all the way up, the locking mechanism is in the unlocked state and omnidirectional rotation is possible. Once the pivot pin 36 is released (e.g., the user releases the finger grips 16), the pivot pin 36 will fall into the pivot track 40 and will rest on a level of the pivot ladder 42 until either being pulled up again or entering the locked state.

The user attaches the towed vehicle to the ball 8, and causes the pivot pin 36 to be released so that the locking state is entered. Accordingly, only omnidirectional rotation is allowed, as indicated by the arrow 64. Then, once the vehicle starts moving forward, the physics of the motion of the towed item will pull the telescoping arm 24 all the way to where the extension restrainer 26 will stop the telescoping arm 24 from further extension. Once the telescoping arm 24 is pulled straight and extended, and/or during the extension of the arm 24, the C Socket 34 will start rotating relative to the pivot 44, as indicated by the arrow 64, so that the aperture 41 and the pivot pin 36 will align and the pivot pin 36 will engage the aperture 41. Should the user back up before the locking mechanism enters the locked state, and while the pivot locking mechanism is in its locking state, the steps of the pivot ladder 42 will preclude rotation away from the aperture 41. Thus, minor adjustments by the user/driver of the towing vehicle will not cause misalignment of the hitch 4.

Once the pivot pin 36 is moved into its locked position the hitch 4 will be straight in line. By moving forward and tapping on the breaks, or by reversing the towing vehicle, the telescoping arm will contract until the spring 18 forces the pin 14 into the lock 27. At this stage the current hitch 4 is in its locked and secured position and it is safe to transport towing item 6 to its final destination.

Figure 7:
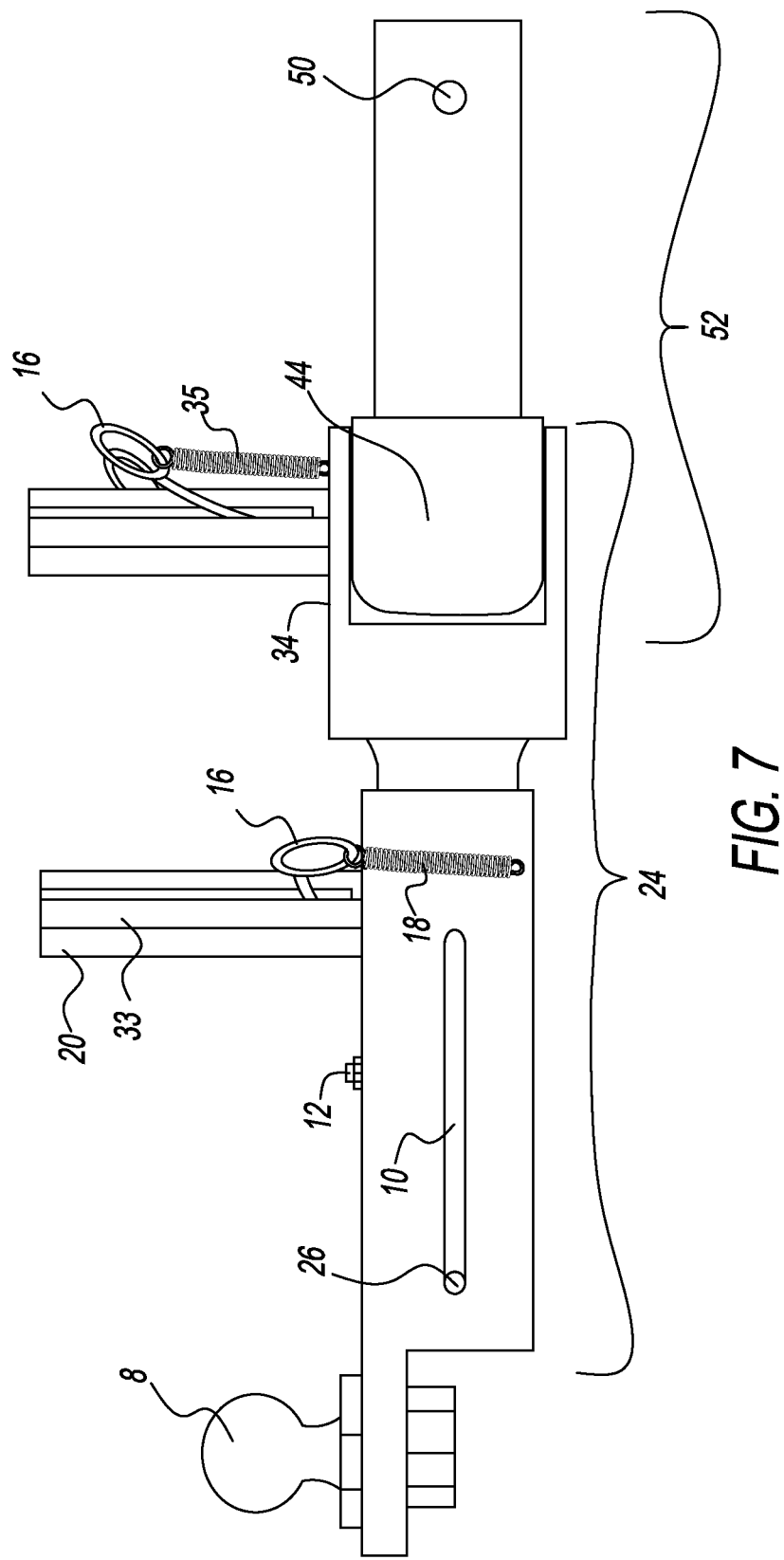
FIG. 7 is a side view of the pin casings.

FIG. 7 is a side view of the pin casings 20 and 33. The pin casings are each a guide that helps the extension pin 14 and the pivot pin 36, respectively, maintain alignment. The pin casings each have at least one open slit in a side, which allows for easy replacement of springs, finger grips, and pins as wanted by user.

While this specification contains many specific implementation details, these should not be construed as limitations on the scope of any inventions or of what may be claimed, but rather as descriptions of features specific to particular embodiments of particular inventions. For example, while shown as having the ball on one end of the telescoping arm, the telescoping arm could instead serve as the base, and the ball could be connected to the member that includes the pivot member.

By way of another example, the stepped surfaces need not be flat, but can be inclined relative to the aperture 41. By way of still another example, the pivot pin 36 and the stepped surfaces need not be flat surfaces; instead, the bottom of the pivot pin can be V-shaped, and each respective surface can define ratchet teeth. Likewise, the pivot track may include ratchet teeth as the stepped surfaces. Thus, when on one side of the longitudinal axis, the ratchet teeth of one side of the V-shaped surfaces of the pivot pin will engage the ratchet teeth of the pivot track, thereby enabling unidirectional rotation towards the aperture, and precluding rotation away from the aperture during the locking state.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims.

What is claimed is:
1. A towing hitch apparatus, comprising:
a base having first and second ends defining a first longitudinal axis and including a first pivot member at a first end;
a telescoping arm assembly having first and second ends defining a second longitudinal axis and having a first member defining the first end and a second member defining the second end, the first end including a second pivot member that pivotally engages the first pivot mem- ber of the base, the first member and second member being in slidable disposition relative to each other along the longitudinal axis; and a pivot locking mechanism in operative engagement with the first and second pivot members and that operates in a locking state and an unlocked state, and when in the unlocked state allows omnidirectional rotation of the first pivot member relative to the second pivot member, and when in the locking state allows only unidirectional rotation of the first pivot member relative to the second pivot member, the unidirectional rotation being in a direction that causes alignment of the first longitudinal axis with the second longitudinal axis;

wherein:

the pivot locking mechanism further operates in a locked state, and enters the locked state from the locking state when the first longitudinal axis aligns with the second longitudinal axis during unidirectional rotation, and the pivot locking mechanism precludes rotation of the first pivot member relative to the second pivot member when in the locked state;

the first pivot member comprises a pivot track disposed along a substantially horizontal surface of the first pivot member;

the second pivot member comprises a pivot socket that receives the first pivot member;

the pivot locking mechanism is rigidly attached to the pivot socket at a position at which the pivot locking mechanism engages the pivot track;

the first longitudinal axis bisects the pivot track of the first pivot member, and the pivot track includes a plurality of adjacent stepped surfaces with the pivot track and defines an aperture that is bisected by the first longitudinal axis, wherein a height of each stepped surface relative to the aperture incrementally increases in proportion to a distance from the aperture; and the pivot locking mechanism includes a pivot pin normally disposed relative to the horizontal surface of the first pivot member, and when in the locking state the pivot pin engages the stepped surfaces of pivot track, and wherein the engagement of an adjacent stepped surface from a currently engaged stepped surface when in the locking state only occurs when the height of the adjacent stepped surface relative to the aperture is lower than the height of the currently engaged stepped surface relative to the aperture.

2. The apparatus of claim 1, wherein each stepped surface defines a respective plane that is parallel to the substantially horizontal surface of the first pivot member.

3. The apparatus of claim 1, wherein the pivot locking mechanism transitions from the locking state to the locked state when the pivot pin engages the aperture.

4. The apparatus of claim 1, wherein the pivot pin is disengaged from the aperture and each disengaged from each stepped surface when the locking mechanism is in the unlocked state.

5. The apparatus of claim 4, wherein the second end of the base is attachable to a towing vehicle receiver, and the second end of the telescoping arm includes a hitch element for engaging a hitch.

6. The apparatus of claim 4, wherein the second end of the base is attachable to a hitch element for engaging a hitch, and the second end of the telescoping arm includes attachable to vehicle receiver.

7. The apparatus of claim 1, wherein the first pivot member and the second pivot member are pivotally connected at a pivot point, the pivot point being located at a point on the first pivot member so that pivot track is interposed between the pivot point and distal edge of the first end.

8. The apparatus of claim 1, wherein the first pivot member and the second pivot member are pivotally connected at a pivot point, the pivot point being located at a point on the first pivot member so that pivot point is interposed between the pivot track and distal edge of the first end.

9. The apparatus of claim 1, wherein:

the first pivot member comprises a curved member defining the pivot track along a substantially horizontal surface of the curved member and an outer curved surface defining a curvature that is substantially normal to horizontal surface.

10. The apparatus of claim 1, wherein the telescoping arm assembly includes a telescoping arm locking mechanism that operates in a locked state and an unlocked stated, and when in the unlocked state allows the first member and second member to move in slidable disposition relative to each other along the longitudinal axis, and when in the locked state precludes the first member and second member from moving in slidable disposition relative to each other along the longitudinal axis.

11. A towing hitch apparatus, comprising:

a base including a first pivot member and defining a first longitudinal axis;

a telescoping arm assembly including a second pivot member and defining a second longitudinal axis, the second pivot member of the telescoping arm assembly being pivotally connected to first pivot member of the base; and a pivot locking mechanism in operative engagement with the first and second pivot members and that operates in a locking state and an unlocked state, and when in the unlocked state allows omnidirectional rotation of the first pivot member relative to the second pivot member, and when in the locking state allows only unidirectional rotation of the first pivot member relative to the second pivot member, the unidirectional rotation being in a direction that causes alignment of the first longitudinal axis with the second longitudinal axis;

wherein:

the first pivot member comprises a pivot track disposed along a substantially horizontal surface of the first pivot member;

the second pivot member comprises a pivot socket that receives the first pivot member; and the pivot locking mechanism is rigidly attached to the pivot socket at a position at which the pivot locking mechanism engages the pivot track;

the first longitudinal axis bisects the pivot track of the first pivot member, and the pivot track includes laddered surfaces within the pivot track and defines an aperture that is bisected by the first longitudinal axis, wherein each laddered surface has a respective height relative to the aperture and the respective height of each surface increases in proportion to a distance of a respective edge of each surface from the aperture; and the pivot locking mechanism includes a pivot pin normally disposed relative to the horizontal surface of the first pivot member, and when in the locking state the pivot pin engages the laddered surfaces of pivot track, and wherein the engagement of a laddered surface from a currently engaged laddered surface when in the locking state only occurs when the height of the laddered surface is lower than the height of the currently engaged currently engaged laddered surface.

12. The apparatus of claim 11, wherein the telescoping arm assembly includes a telescoping arm locking mechanism that operates in a locked state and an unlocked stated, and when in the unlocked state allows the first member and second member to move in slidable disposition relative to each other along the longitudinal axis, and when in the locked state precludes the first member and second member from moving in slidable disposition relative to each other along the longitudinal axis.

13. The apparatus of claim 11, wherein the second end of the base is attachable to a towing vehicle receiver, and the second end of the telescoping arm includes a hitch element for engaging a hitch.

14. The apparatus of claim 11, wherein the second end of the base is attachable to a hitch element for engaging a hitch, and the second end of the telescoping arm includes attachable to vehicle receiver.

15. The apparatus of claim 11, wherein the first pivot member and the second pivot member are pivotally connected at a pivot point, the pivot point being located at a point on the first pivot member so that pivot track is interposed between the pivot point and distal edge of the first end.

16. A towing hitch apparatus, comprising:
- a first portion including a first pivot member and defining a first longitudinal axis, the first pivot member comprising a pivot track disposed along a substantially horizontal surface of the first pivot member;
- a second portion including a second pivot member and defining a second longitudinal axis, the second pivot member comprising a pivot socket that receives the first pivot member and being pivotally connected to first pivot member;
- a pivot locking mechanism in operative engagement with the first and second pivot members and that operates in a locking state and an unlocked state, and when in the unlocked state allows omnidirectional rotation of the first pivot member relative to the second pivot member, the pivot locking mechanism attached to the pivot socket at a position at which the pivot locking mechanism engages the pivot track;

wherein:
- the first longitudinal axis bisects the pivot track of the first pivot member, and the pivot track includes laddered surfaces within the pivot track and defines an aperture that is bisected by the first longitudinal axis, wherein each laddered surface has a respective height relative to the aperture and the respective height of each surface increases in proportion to a distance of a respective edge of each surface from the aperture; and
- the pivot locking mechanism includes a pivot pin normally disposed relative to the horizontal surface of the first pivot member, and when in the locking state the pivot pin engages the laddered surfaces of pivot track, and wherein the engagement of a laddered surface from a currently engaged laddered surface when in the locking state only occurs when the height of the laddered surface is lower than the height of the currently engaged currently engaged laddered surface.

* * * * *

UNITED STATES PATENT AND TRADEMARK OFFICE
CERTIFICATE OF CORRECTION

PATENT NO. : 8,474,852 B1
APPLICATION NO. : 13/195751
DATED : July 2, 2013
INVENTOR(S) : Matthew David Granados It is certified that error appears in the above-identified patent and that said Letters Patent is hereby corrected as shown below:

In the Claims:

Claim 10, Column 8, Line 16 – delete "stated" and insert -- state --, therefor.

Claim 11, Column 8, Line 65 – before "laddered" delete "currently engaged".

Claim 12, Column 9, Line 1 – delete "stated" and insert -- state --, therefor.

Claim 16, Column 10, Line 27 – before "laddered" delete "currently engaged".

Signed and Sealed this
Tenth Day of September, 2013

Teresa Stanek Rea
*Acting Director of the United States Patent and Trademark Office*